(12) United States Patent
Arndt et al.

(10) Patent No.: US 6,622,693 B2
(45) Date of Patent: Sep. 23, 2003

(54) FUEL INJECTION SYSTEM

(75) Inventors: Stefan Arndt, Stuttgart (DE); Werner Herden, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,519

(22) PCT Filed: Jul. 3, 2001

(86) PCT No.: PCT/DE01/02398

§ 371 (c)(1),
(2), (4) Date: Jul. 10, 2002

(87) PCT Pub. No.: WO02/02928

PCT Pub. Date: Jan. 10, 2002

(65) Prior Publication Data

US 2002/0185104 A1 Dec. 12, 2002

(30) Foreign Application Priority Data

Jul. 4, 2000 (DE) .......................................... 100 32 336

(51) Int. Cl.[7] .................................................. F02B 3/00

(52) U.S. Cl. ...................................... 123/299; 123/305

(58) Field of Search ................................ 123/299, 294, 123/295, 301, 305; 239/556, 558, 559

(56) References Cited

U.S. PATENT DOCUMENTS

| 4,548,172 A | * 10/1985 | Bailey .......................... 92/220 |
| 4,932,374 A | * 6/1990 | Klomp et al. ................ 123/298 |
| 5,058,549 A | * 10/1991 | Hashimoto et al. .......... 123/298 |
| 5,713,327 A | * 2/1998 | Tilton et al. ................. 123/299 |
| 6,422,198 B1 | * 7/2002 | VanBrocklin et al. ........ 123/294 |

FOREIGN PATENT DOCUMENTS

| DE | 196 42 653 | 1/1998 |
| DE | 198 27 219 | 1/1999 |
| DE | 198 04 463 | 8/1999 |
| JP | 07 063 061 | 3/1995 |
| JP | 11 050848 | 2/1999 |
| JP | 249 026 | 9/2000 |

* cited by examiner

Primary Examiner—John Kwon
(74) Attorney, Agent, or Firm—Kenyon & Kenyon

(57) ABSTRACT

A fuel injection system for internal combustion engines comprises a fuel injector that injects fuel into a combustion chamber, the combustion chamber being delimited by a cylinder wall in which a piston is guided, and a spark plug that protrudes into combustion chamber. The fuel injector produces a conical mixture cloud in the combustion chamber through at least one row of injection orifices arranged circumferentially on a valve body of the fuel injector. The valve body also provides a centrally arranged injection orifice that produces a central area of the mixture cloud directed towards the spark plug.

11 Claims, 5 Drawing Sheets

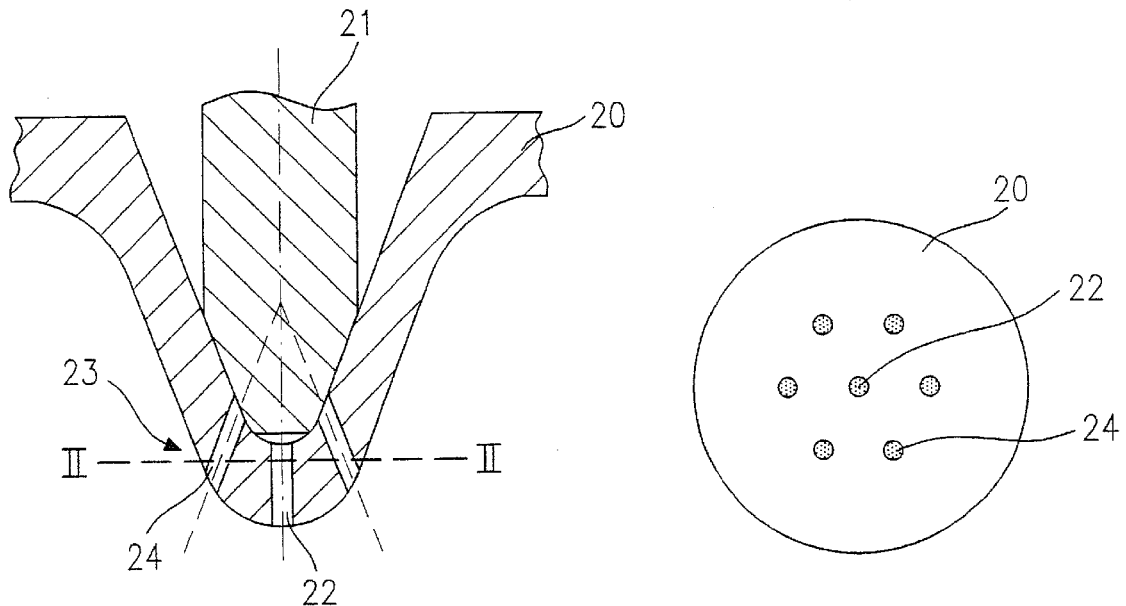
Fig. 2A
Fig. 2B
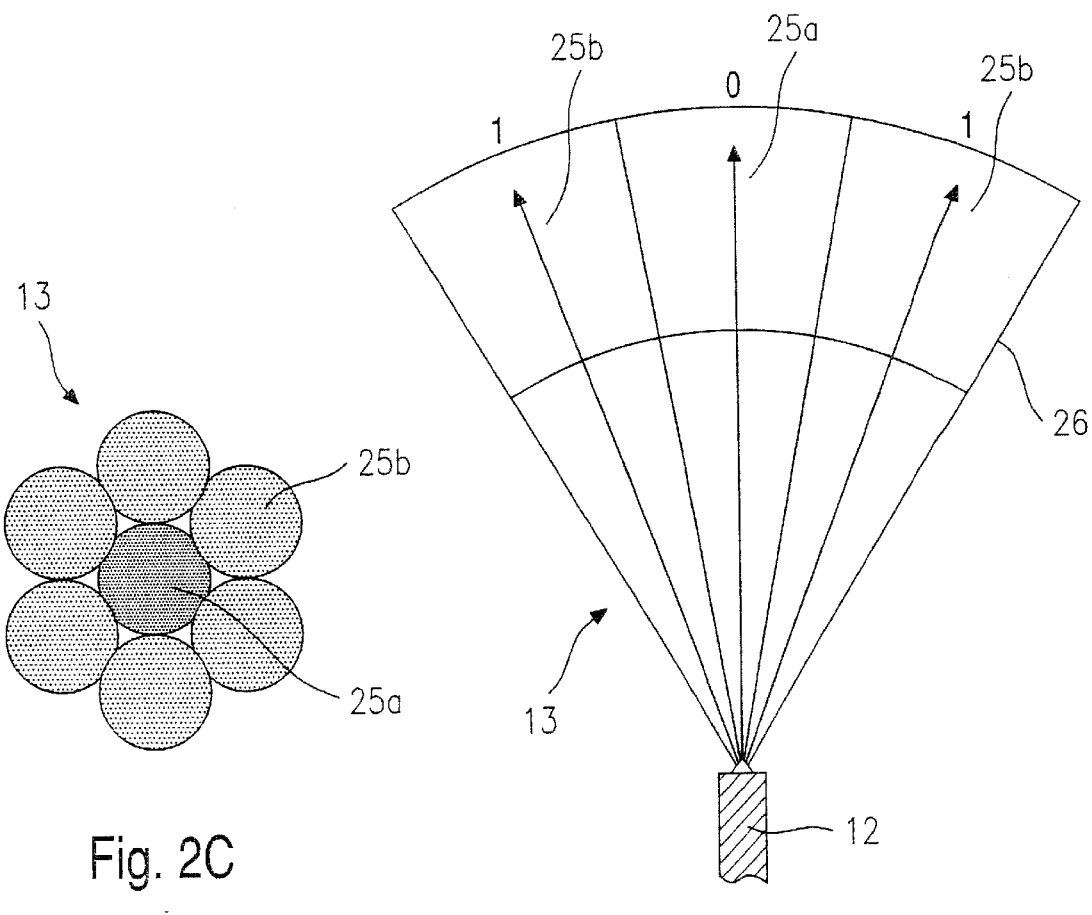
Fig. 2C
Fig. 2D

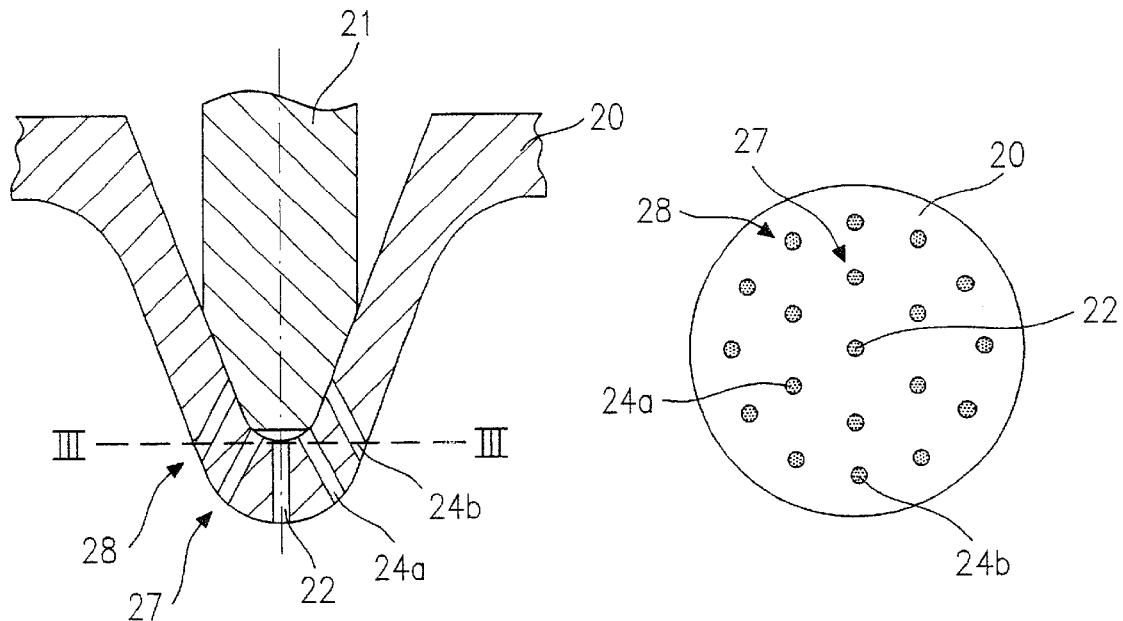
Fig. 3A
Fig. 3B
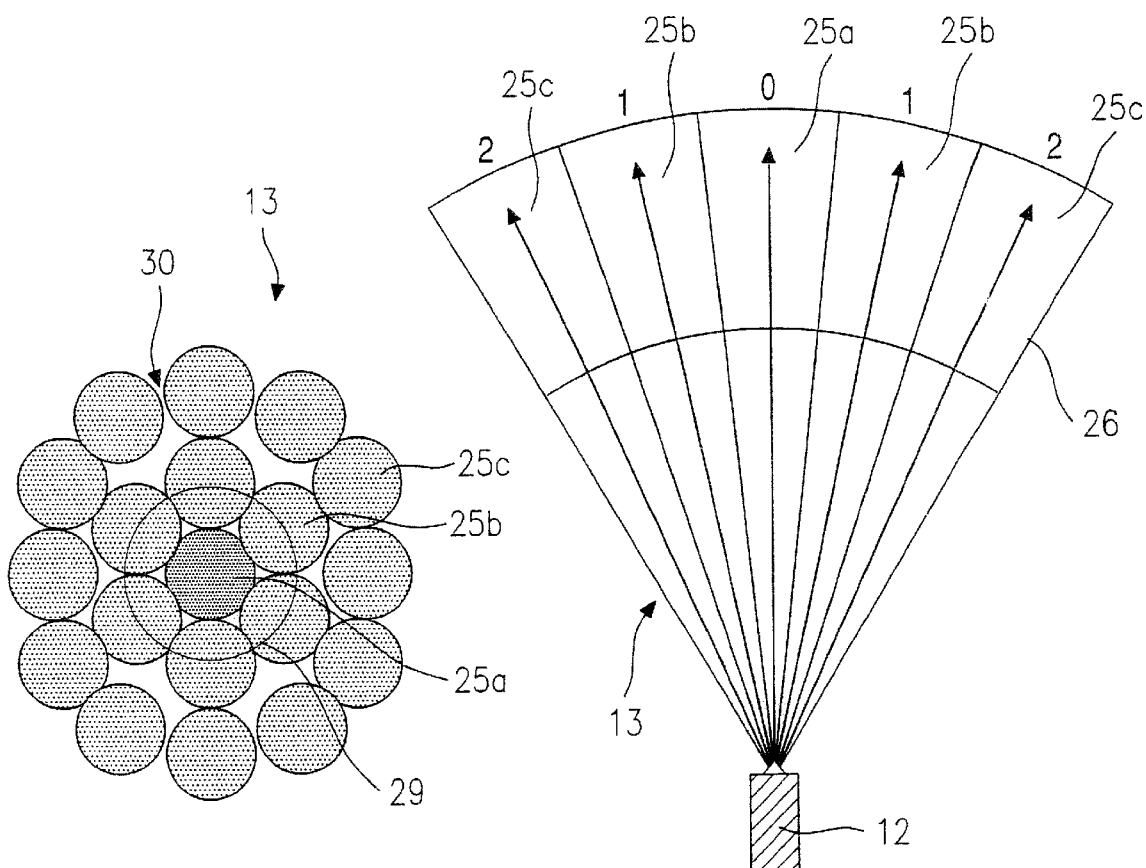
Fig. 3C
Fig. 3D

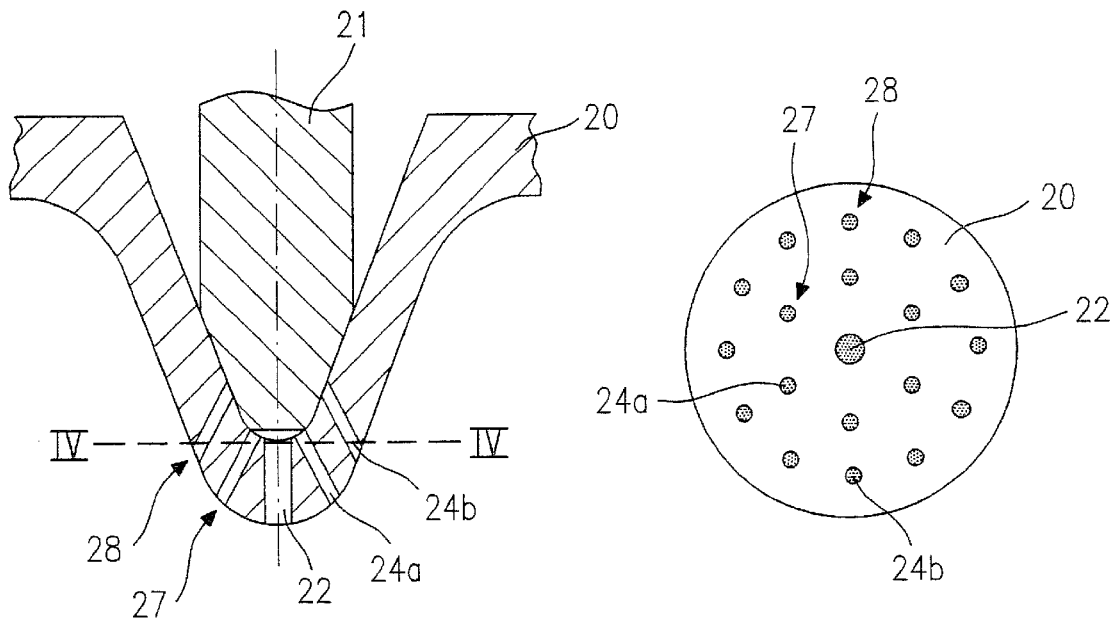
Fig. 4A
Fig. 4B
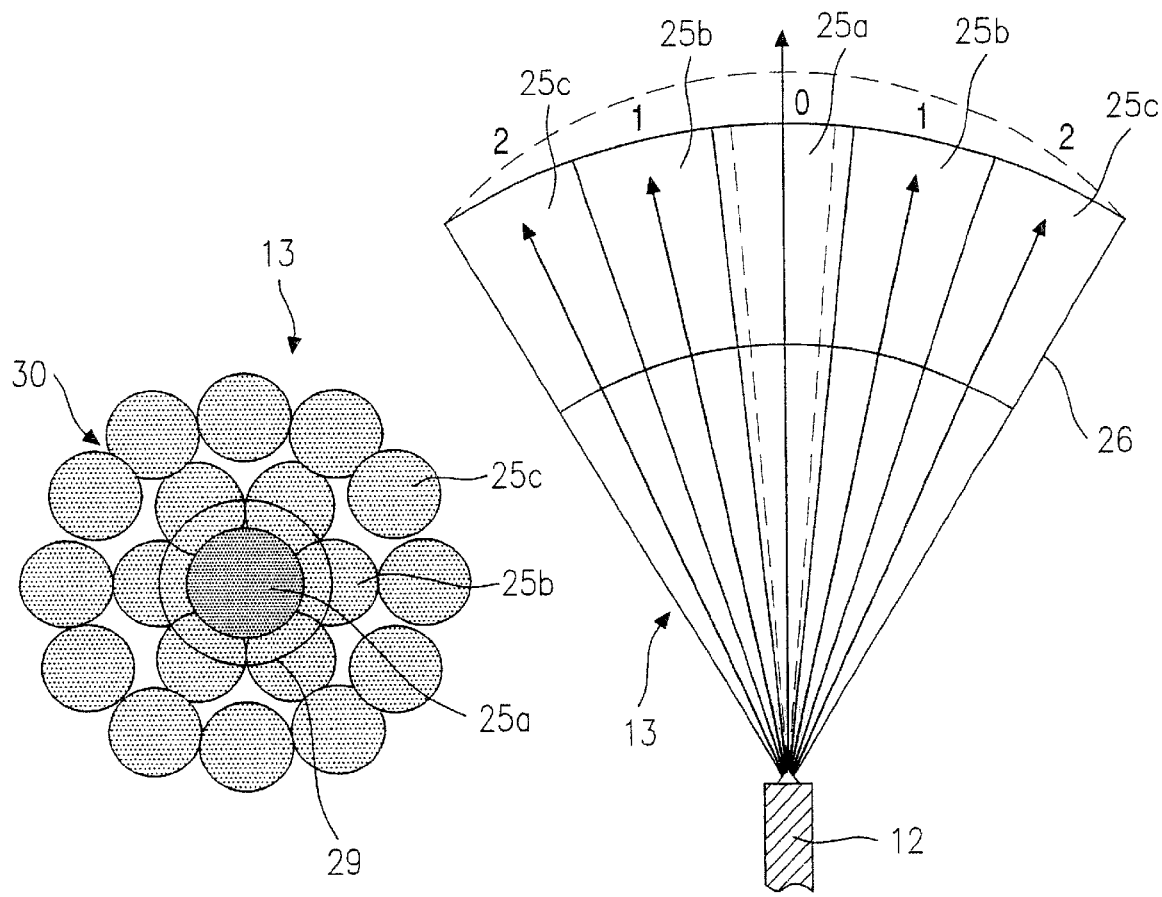
Fig. 4C
Fig. 4D

FUEL INJECTION SYSTEM

FIELD OF THE INVENTION

The present invention is based on a fuel injection system.

BACKGROUND INFORMATION

German Published Patent Application No. 198 27 219 describes a fuel injection system for an internal combustion engine having an injector with a fuel jet adjustment plate, which is furnished with first nozzle orifices that are arranged in a first circle, and second nozzle orifices that are arranged in a second circle. The second circle has a diameter that is greater than that of the first circle. The circles are arranged coaxially to a center line of the adjustment plate. Each orifice axis of the second nozzle orifices forms an acute angle with a reference plane, which is perpendicular to the center line of the valve body. The angle is smaller than the angle that is formed between the reference plane and each orifice axis of the first nozzle orifices. In that way, atomized fuel that is injected through first nozzle orifices may be directed away from the atomized fuel that is injected through second nozzle orifices. One result of this arrangement is that the atomized fuel that is injected through the first nozzle orifices does not interfere with the atomized fuel that is injected through the second nozzle orifices, which makes it possible to atomize the injected fuel suitably.

German Published Patent No. 196 42 653 describes a method of forming an ignitable fuel-air mixture. An ignitable fuel-air mixture is formable in the cylinders of direct-injection internal combustion engines, in that fuel is injected into each combustion chamber delimited by a piston, by way of an injector on opening of a nozzle orifice due to a valve element being lifted up from a valve seat surrounding the nozzle orifice. To permit formation of an internal mixture optimized for fuel consumption and emissions at each operating point of the entire engine characteristics map under all operating conditions of the internal combustion engine, in particular in stratified charge operation, the opening stroke of the valve element and the injection time are adjustable.

German Published Patent Application No. 198 04 463 describes a fuel injection system for internal combustion engines having spark ignition of a compressed fuel mixture; this fuel injection system is provided with an injector which injects fuel into a combustion chamber formed by a piston/cylinder arrangement and is equipped with a spark plug projecting into the combustion chamber. The injector is provided with at least one row of injection orifices distributed over the circumference of the injection nozzle. Through controlled injection of fuel through the injection orifices, a jet-guided combustion method is implemented by the formation of a mixture cloud, at least one jet being directed for ignition in the direction of the spark plug. Other jets are provided to assure that the mixture cloud formed is at least approximately closed or contiguous.

The methods of mixture formation and fuel injection systems described in the documents cited particularly share the disadvantages of inadequate homogeneity of the mixture cloud, and the problem of transporting the ignitable mixture to the region of the spark plug's air gap. In order to enable low-emission, low-consumption combustion, complex combustion chamber geometries, helical valves or swirl mechanisms must be used in such cases to ensure that the combustion chamber is filled with a fuel-air mixture, and that the ignitable mixture is brought into the proximity of the spark plug.

The fuel is sprayed directly onto the spark plug. This results in heavy sooting of the spark plug and frequent thermal shocks, which shorten the service life of the spark plug.

The disadvantage of the method described in German Published Patent No. 196 42 653 for the formation of an ignitable fuel-air mixture is the additional impossibility of accurately dosing small quantities of fuel, particularly in stratified charge operation, because the opening and closing times of the fuel injector cannot be controlled with sufficient precision.

It is furthermore disadvantageous that complicated combustion chamber geometries and fuel injectors with swirl arrangement are difficult and expensive to produce.

SUMMARY OF THE INVENTION

The fuel injection system according to the present invention provides at least one row of injection orifices and a central injection orifice, which provide a mixture cloud having a stoichiometric or slightly rich core ($0.8 < \lambda < 1.1$) and a lean outer region ($1.5 < \lambda < 2.5$) in the combustion chamber.

If the core of the mixture cloud is located in the area of the spark plug air gap at the moment of ignition, the core may ignite quickly, combust completely, and in turn ignite the lean outer region. This combustion method features particularly low nitrogen oxide emissions, since only a small portion of the mixture cloud, i.e., the interior stoichiometric core, burns at a high temperature so that only small quantities of nitrogen oxides are released, whereas the lean outer region, which occupies a significantly greater volume may combust at a lower temperature with negligible nitrogen oxide emissions.

The present invention provides that injection orifices in at least one row of circumferentially arranged injection orifices and the central injection orifice have different diameters. By appropriate selection of the orifice diameter it is possible to create an injection cone having a more or less rich core.

If the diameter of the central injection orifice is selected to be greater than that of the other injection orifices, it is also possible to create a parachute-type shape to the conical injection jet, thus filling the combustion chamber better and also ensuring improved stoichiometric distribution in the mixture cloud.

This may be achieved with two rows of circumferentially arranged injection orifices, if the diameters of the outer row of injection orifices are smallest, the injection orifices of the inner row are somewhat larger, and the central injection orifice has the largest diameter.

A geometrical arrangement of the injection orifices of the inner and outer rows is also advantageous, according to which two injection orifices in the outer row correspond to one injection orifice in the inner row. The number of injection orifices per row is thus twice the number of injection orifices in the row immediately inferior thereto. In this way, not only the homogeneity but also the conformation and stoichiometry of the mixture cloud may be controlled.

BRIEF DESCRIPTION OF THE DRAWINGS

FIG. 2A is a longitudinal view of a first embodiment of the valve body of the fuel injector of a fuel injection system according to the present invention.

FIG. 2B is a cross-sectional view of a first embodiment of the valve body of the fuel injector of a fuel injection system according to the present invention.

FIG. 2C is a longitudinal view of the mixture cloud produced by the valve body of FIGS. 2A and 2B.

FIG. 2D is a cross-sectional view of the mixture cloud of FIG. 2C.

FIG. 3A is a longitudinal view of a second embodiment of the valve body of the fuel injector of a fuel injection system according to the present invention.

FIG. 3B is a cross-sectional view of a second embodiment of the valve body of the fuel injector of a fuel injection system according to the present invention.

FIG. 3C is a longitudinal view of the mixture cloud produced by the second embodiment of FIG. 3A and FIG. 3B.

FIG. 3D is a cross-sectional view of the mixture cloud produced by the second embodiment of FIG. 3A and FIG. 3B.

FIG. 4A is a longitudinal view of a third embodiment of the valve body of the fuel injector of a fuel injection system according to the present invention.

FIG. 4B is a cross-sectional view of a third embodiment of the valve body of the fuel injector of a fuel injection system according to the present invention.

FIG. 4C is a longitudinal view of the mixture cloud produced by the third embodiment of FIG. 4A and FIG. 4B.

FIG. 4D is a cross-sectional view of the mixture cloud produced by the third embodiment of FIG. 4A and FIG. 4B.

DETAILED DESCRIPTION

Figure 1:
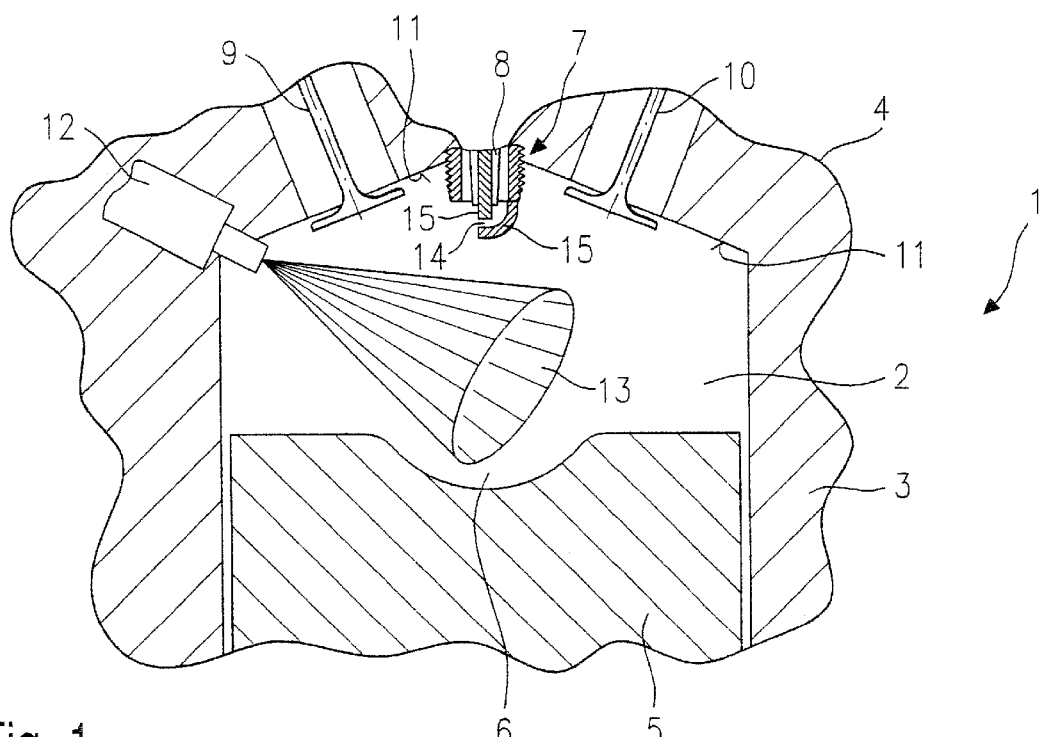
FIG. 1 is a schematic sectional view through an embodiment of a fuel injection system according to related art.

FIG. 1 illustrates a schematic section through an embodiment of a fuel injection system in prior systems. Fuel injection system 1 has a combustion chamber 2, which is delimited by a cylinder wall 3, a cylinder head 4, and piston 5. A combustion chamber depression 6 is formed in piston 5. A spark plug 8 having two electrodes 15 is, for example, centrally situated on a ridge 7 in combustion chamber 2. An inlet valve 9 and an outlet valve 10 are indicated schematically on ridge inclines 11 of combustion chamber 2. A fuel injector 12 situated laterally between cylinder wall 3 and cylinder head 4 injects a conical mixture cloud 13 into combustion chamber 2. The geometry of combustion chamber depression 6 and the shape of mixture cloud 13 determine the path taken by mixture cloud 13 to the region of an air gap 14 that exists between electrodes 15 of spark plug 8. Mixture cloud 13 is ignited by the electrical spark of spark plug 8.

FIGS. 2A through 2D show a longitudinal and a cross-sectional view through a first embodiment of a valve body 20 of fuel injector 12 of a fuel injection system 1 according to the present invention, and a longitudinal and a cross-sectional view through mixture cloud 13 produced by fuel injector 12.

FIG. 2A is a schematic diagram of a longitudinal section of the injection side part of fuel injector 12 having a valve body 20 that operates in conjunction with a valve closing body 21. Valve body 20 is furnished with a central injection orifice 22 and a row 23 of circumferentially arranged injection orifices 24.

When fuel injector 12 is in the quiescent state, injection orifices 22 and 24 are closed off by valve closing body 21. If fuel injector 12 is actuated by a magnetic or piezoelectric actuator, valve closing body 21, which is connected to a valve needle (not shown) is lifted away from valve body 20 and frees the path to injection orifices 22 and 24. Fuel is injected through these into combustion chamber 2.

FIG. 2B is a sectional view through valve body 20 along the line II—II indicated in FIG. 2A. Central injection orifice 22 is located in the middle. Circumferentially arranged injection orifices 24 are evenly distributed about the circumference of valve body 20. In the embodiment illustrated, six injection orifices 24 were chosen.

FIG. 2C is a conceptualized cross-section through conical mixture cloud 13 that is produced by fuel injector 12 shown in FIG. 2A. Each of injection orifices 22 and 24 produces a conical injection jet 25. In this embodiment, an inner injection jet 25a is surrounded by six outer injection jets 25b. Mixture cloud 13 produced thereby has an approximately conical envelope 26 and is relatively homogeneous (FIG. 2D). Due to minor overlapping between inner injection jet 25a and outer injection jets 25b, the core of mixture cloud 13 is slightly rich.

FIG. 2D is a longitudinal view through conical mixture cloud 13 that is produced by fuel injector 12 illustrated in FIG. 2A. The arrow marked with 0 represents inner injection jet 25a produced by central injection orifice 22, and the arrows marked with 1 represent outer injection jets 25b produced by circumferentially arranged injection orifices 24. Envelope 26 of outer injection jets 25b expands in an approximately conical shape.

Similarly to FIGS. 2A–2D, FIGS. 3A–3D show longitudinal and cross-sectional views of the jetting part of a second embodiment of fuel injector 12, and a longitudinal and a cross-sectional view through mixture cloud 13 produced thereby.

FIG. 3A again is a view of the injection side part of fuel injector 12 with the valve closing body 21 and valve body 20. In the present, second embodiment, valve body 20 is furnished with an inner row 27 of circumferentially arranged injection orifices 24a, and an outer row 28 of circumferentially arranged injection orifices 24b in addition to central injection orifice 22. When fuel injector 12 is actuated, valve closing body 21 is lifted away from valve body 20 and frees the path to injection orifices 22 and 24a and 24b.

FIG. 3B is a sectional view through valve body 20 along the line III—III indicated in FIG. 3A. Injection orifices 24a of inner row 27 and injection orifices 24b of outer row 28 are arranged around central injection orifice 22. In this embodiment, all these orifices have the same aperture cross-section.

FIG. 3C is a cross-section through mixture cloud 13 that is produced by fuel injector 12 shown in FIG. 3A. A central injection jet 25a produced by central injection orifice 22 is surrounded by injection jets 25b of inner row 27 of circumferentially arranged injection orifices 24a, which are themselves surrounded by outer injection jets 25c, which are injected from injection orifices 24b of outer row 28. Minor overlapping between injection jets 25b and central injection jets 25a produces a rich core area 29 that is surrounded by a lean mantle area 30.

FIG. 3D is a longitudinal view through mixture cloud 13 that is produced by the fuel injector 12 illustrated in FIG.

3A. Injection jet 25a marked with 0 is produced by central injection orifice 22. Injection jets 25b marked with 1 are injected through injection orifices 24a of inner row 27, and injection jets 25c marked with 2 are injected through injection orifices 24b of outer row 28. Envelope 26 of mixture cloud 13 again expands in an approximately conical shape.

Similarly to FIGS. 2A–2D and FIGS. 3A–3D, FIGS. 4A–4D illustrate a fuel injector 12, whose valve body 20 is furnished with a larger central injection orifice 22 than in FIG. 3A, as well as an inner row 27 and an outer row 28 of circumferentially arranged injection orifices 24a and 24b. When fuel injector 12 is actuated, valve closing body 21 is lifted away from valve body 20 and frees the path to injection orifices 22 and 24a and 24b.

FIG. 4B again is the arrangement of injection orifices 22 and 24 in a sectional view along the line IV—IV. Central injection orifice 22 has a larger diameter than the injection orifices 24a arranged in inner row 27 and the injection orifices 24b arranged in outer row 28.

FIG. 4C illustrates that the inner injection jet 25a having a cone with a larger diameter results from the enlarged central injection orifice 22, in comparison with the preceding embodiments. The areas in which inner injection jet 25a overlaps with injection jets 25b of inner row 27 are increasing, and the rich core area 29 of mixture cloud 13 is consequently richer. Rich core area 29 of mixture cloud 13 is again surrounded by a lean mantle area 30.

FIG. 4D again is a longitudinal view through the mixture cloud 13 that is injected into combustion chamber 2 through the fuel injector 12 illustrated in FIG. 4A. Inner injection jet 25a, which is injected through the enlarged central injection orifice 22, occupies a broader space than does, for example, the injection jet 25a of the smaller central injection orifice 22 shown in FIG. 3D. The smaller cone diameter is indicated with dotted lines for comparison in FIG. 4D. With this arrangement, the rich core area 29 may be adjusted at will to be richer or leaner, and may be further expanded. In the embodiments shown in FIGS. 3 and 4, inner row 27 includes six injection orifices 24a, and outer row 28 includes twelve injection orifices 24b.

Figures 5, 6:
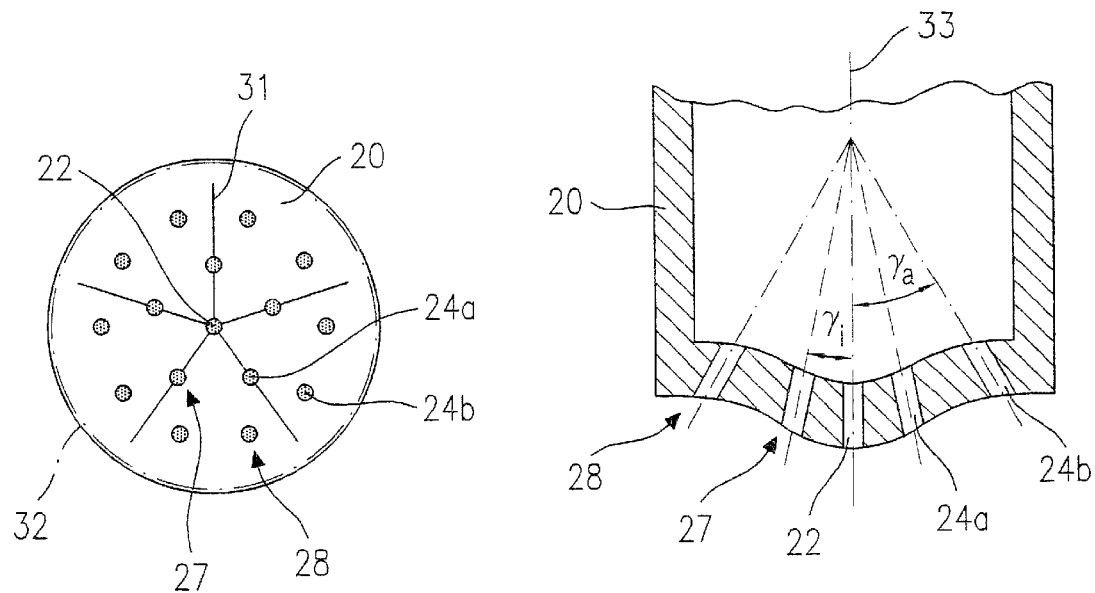
FIG. 5 is a cross-sectional view of the jetting end of the valve body of the fuel injector of a fuel injection system according to the present invention.
FIG. 6 is a longitudinal view of a further embodiment of a valve body of the fuel injector of a fuel injection system according to the present invention.

The injection orifices 24 may be arranged as shown in FIG. 5. The present illustration is a cross-sectional view through the injection end of valve body 20 of fuel injector 12, for example along sectional line III—III in FIG. 3A.

The numbers of injection orifices 24a of inner row 27 and injection orifices 24b of outer row 28 are linked in particular fashion. In the present embodiment, a number n=5 of injection orifices 24a of inner row 27 is distributed around a central injection orifice 22. The number of injection orifices 24b distributed in outer row 28 is double this number, 2n=10. At the same time, injection orifices 24b of outer row 28 are arranged so that they are symmetrical to a ray 31 that extends in each case from central injection orifice 22 through orifices 24a of inner row 27 and towards outer row 28. Outer injection orifices 24b are each arranged symmetrically to this ray 31. In general, the number of injection orifices 24 is always double for each adjacently outer row 32 with respect to the number of injection orifices 24 in the adjacent inner row. This enables the production of a highly homogeneous mixture cloud 13.

FIG. 6 is the injection side part of valve body 20 of fuel injector 12, which illustrates the general relationships between the diameters of injection orifices 24, the diameter of central injection orifice 22, and the different injection angles $Y_i$ and $Y_a$. The following table explains in general terms the optimum configuration of a fuel injection system 1 having a central injection orifice 22 and at least two rows, 27 and 28, of circumferentially arranged injection orifices 24a and 24b.

|  | Number n of orifices | Orifice diameter Φ | Angle of inclination γ |
|---|---|---|---|
| centrally arranged injection orifice | $0 < n_z < 1$ | $50\,\mu m < \Phi_z < 200\,\mu m$ | 0° |
| inner row of injection orifices | $2 < n_i < 7$ | $40\,\mu m < \Phi_i < 180\,\mu m$ | $13° < \gamma_i < 27°$ |
| outer row of injection orifices | $5 < n_a < 14$ | $30\,\mu m < \Phi_a < 160\,\mu m$ | $22° < \gamma_a < 48°$ |

For each of rows 27 and 28, and for central injection orifice 22, the table shows the numbers $n_z$, $n_i$, $n_a$ of injection orifices 24a and 24b, the orifice diameters for injection orifices 22, 24a, and 24b, and the angles of inclination $Y_i$ or $Y_a$ of the axes of injection orifices 22, 24a, and 24b, or the axes of injection orifices 25a, 25b and 25c relative to a central valve axis 33. On the basis of this table, it is possible to describe any arrangement of injection orifices 22, 24a, and 24b in rows 27 and 28 in a triplet (n, Φ, γ), where n represents the number of injection orifices 24a, 24b per row 27 and 28, Φ represents the diameter of injection orifices 22, 24a, and 24b, and γ represents the angle of inclination to valve axis 33. In general, the diameter of central injection orifice 22 should always be greater than the diameter of injection orifices 24a of the inner row 27, and this, in turn, should be greater than the diameter of injection orifices 24b in outer row 28 ($\Phi_z > \Phi_i > \Phi_a$). Accordingly, the diameters of further rows of circumferentially arranged injection orifices 24 become smaller with an increasing number of rows.

Figure 7:
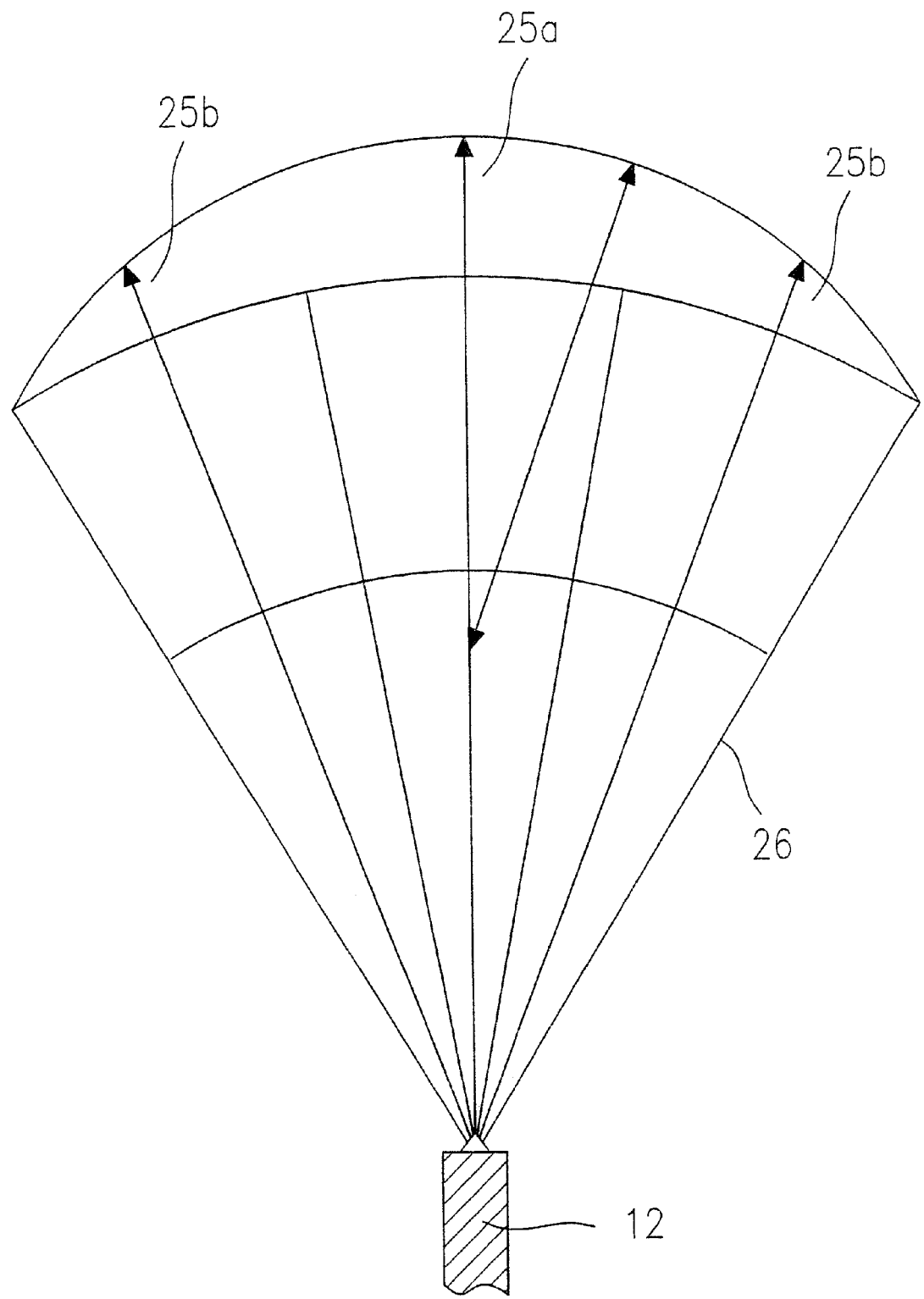
FIG. 7 is a view of the mixture cloud produced by a further embodiment of the fuel injection system according to the present invention.

FIG. 7, with reference to a longitudinal section through the mixture cloud 13 produced by a correspondingly formed fuel injector 12, illustrates how the successive reduction in size of injection orifices 24a, 24b from central injection orifice 22 outward causes the truncated cone of mixture cloud 13 to assume approximately the shape of a parachute due to hydrodynamic forces as it flows through injection orifices 24a, 24b and 22. This effect is caused by the fact that injection orifices 24a and 24b in first row 27, and second row 28 have a smaller diameter, so that less fuel flows through them per unit of time than through the larger central injection orifice 22. As a result, the fuel exiting central injection orifice 22 is injected farther into combustion chamber 2 than the fuel exiting through injection orifices 24a and 24b. Consequently, mixture cloud 13 better fills combustion chamber 2. Stoichiometrically rich core area 29 may be better transported to the region of air gap 14 of spark plug 8, and combustion may take place more effectively with lower fuel consumption and reduced emissions.

This general formulation may be used as the basis for designs of the fuel injection system to satisfy the requirements of the internal combustion engine and the combustion chamber geometry.

The present invention is not limited to the embodiments shown and, for example, may also be applied to fuel injectors with more than two rows of injection orifices, different injection orifice diameters or a different number of injection orifices per row.

What is claimed is:
1. A fuel injection system for an internal combustion engine, comprising:
   a fuel injector including a valve body and configured to inject fuel directly into a combustion chamber delimited by a cylinder wall in which a piston is guided; and a spark plug protruding into the combustion chamber, the fuel injector configured to produce a conically shaped injection jet in the combustion chamber through at least one row of injection orifices arranged circumferentially on the valve body, wherein the valve body includes a centrally arranged injection orifice that is configured to produce the conically shaped injection jet to have an enriched central region and to travel as far as the spark plug.

2. The fuel injection system according to claim 1, wherein the at least one row of injection orifices includes two rows of injection orifices.

3. The fuel injection system according to claim 1, wherein a diameter of each of the injection orifices of the at least one row of injection orifices and a diameter of the centrally arranged injection orifice are different.

4. The fuel injection system according to claim 1, wherein a diameter of the centrally arranged injection orifice is greater than a diameter of each of the injection orifices of the at least one row.

5. The fuel injection system according to claim 4, wherein the at least one row of injection orifices includes two rows of circumferentially arranged injection orifices, and a diameter of each of the injection orifices in an inner row of the two rows situated closer to the centrally arranged injection orifice is larger than a diameter of the injection orifices in an outer row of the two rows.

6. The fuel injection system according to claim 5, wherein the diameter of the injection orifices of the at least one row is progressively reduced as a distance of the injection orifices of the at least one row from the centrally arranged injection orifice increases.

7. The fuel injection system according to claim 5, wherein the outer row has a number of injection orifices that is twice that of the inner row.

8. The fuel injection system according to claim 7, wherein each successive outer row of injection orifices has twice as many injection orifices as an immediately adjacent inner row.

9. The fuel injection system according to claim 5, wherein the injection orifices of the inner row are angularly offset with respect to the injection orifices of the outer row, two injection orifices of the outer row being assigned symmetrically to a ray that extends from the centrally arranged injection orifice through each injection orifice of the inner row to the outer row.

10. The fuel injection system according to claim 1, wherein the fuel injector is configured to be operated by a magnetic actuator.

11. The fuel injection system according to claim 1, wherein the fuel injector is configured to be operated by a piezoelectric actuator.

* * * * *